US005179460A

United States Patent [19]

Hinata et al.

[11] Patent Number: 5,179,460

[45] Date of Patent: Jan. 12, 1993

[54] INPUT DEVICE HAVING DOUBLE-LAYER ADHESIVE CONDUCTIVE CONNECTING PORTIONS

[75] Inventors: Shoji Hinata; Yohichi Ono; Satoshi Wakabayashi, all of Nagano, Japan

[73] Assignee: Seiko Epson Corporation, Tokyo, Japan

[21] Appl. No.: 530,867

[22] Filed: May 31, 1990

[30] Foreign Application Priority Data

May 31, 1989 [JP] Japan ..... 1-138732
May 31, 1989 [JP] Japan ..... 1-138733
May 31, 1989 [JP] Japan ..... 1-138734
Nov. 15, 1989 [JP] Japan ..... 1-298982

[51] Int. Cl.[5] ..... G02F 1/13; H01H 13/70; G06F 3/00

[52] U.S. Cl. ..... 359/88; 359/80; 359/82; 200/268

[58] Field of Search ..... 350/331 R, 334, 336, 350/343, 344; 340/706, 712, 784; 200/511, 512, 262, 267, 268, 292; 361/400, 402, 411; 439/66

[56] References Cited

U.S. PATENT DOCUMENTS

| | | | |
|---|---|---|---|
| 4,297,004 | 10/1981 | Nishimura et al. | 350/334 |
| 4,403,272 | 9/1987 | Larson | 361/398 |
| 4,422,731 | 12/1983 | Dzoquet et al. | 350/334 |
| 4,443,223 | 2/1984 | Larson | 200/512 |
| 4,496,812 | 1/1985 | Carley | 200/159 |
| 4,527,862 | 7/1985 | Azakawa | 350/334 |
| 4,682,858 | 7/1987 | Kanbe et al. | 350/334 |
| 4,683,360 | 7/1987 | Maser | 200/314 |
| 4,697,885 | 10/1987 | Minawa et al. | 350/334 |
| 4,842,373 | 6/1989 | Tomofuji et al. | 350/343 |
| 4,896,946 | 1/1990 | Suzuki et al. | 350/344 |
| 4,906,071 | 3/1990 | Takahara et al. | 350/334 |

FOREIGN PATENT DOCUMENTS

| | | | |
|---|---|---|---|
| 2389217 | 11/1978 | France . | |
| 2531567 | 2/1984 | France . | |
| 0046230 | 3/1982 | Japan | 350/343 |
| 0171319 | 10/1982 | Japan | 350/343 |
| 0117522 | 7/1983 | Japan | 350/343 |
| 0067516 | 4/1984 | Japan | 350/343 |
| 1516731 | 5/1980 | United Kingdom . | |

*Primary Examiner*—William L. Sikes
*Assistant Examiner*—Tai V. Duong
*Attorney, Agent, or Firm*—Blum Kaplan

[57] ABSTRACT

An input structure for a display device having opposed substrates an electrodes disposed on the inner surfaces of the substrates and a seal about the periphery thereof with a relay electrode crossing the seal to connect the electrodes on the opposed substrate to external circuitry. The electrical connection between the electrodes on the first substrate to the relay electrode is provided by a conductive adhesive electrode and a conductive synthetic resin thin film layer contacting the conductive adhesive electrode, the thin film layer formed of conductive material which is shorter than the conductive material of the conductive adhesive electrode to absorb shock and avoid separation of the electrodes from the opposed substrate.

20 Claims, 6 Drawing Sheets

FIG. 10
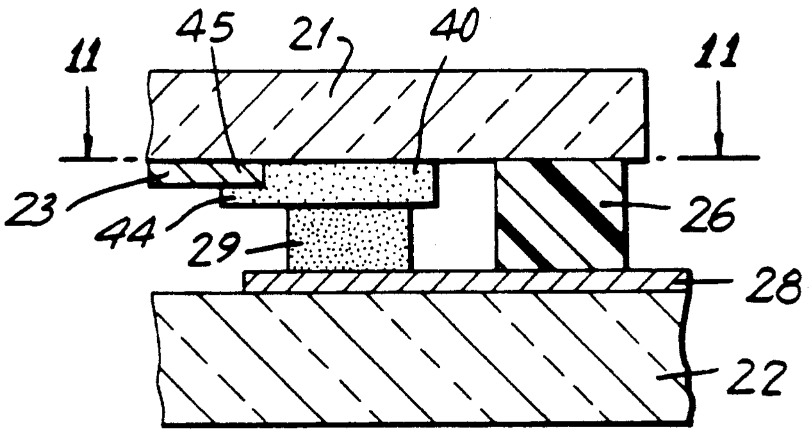
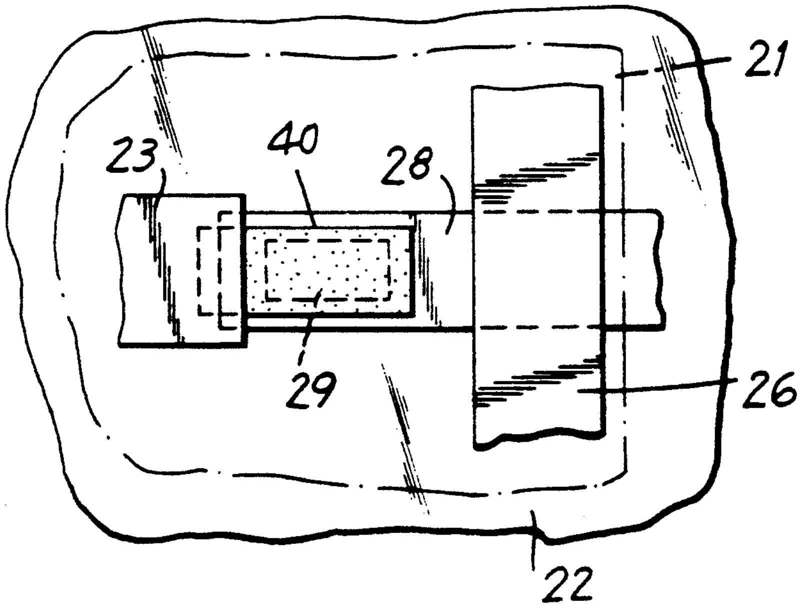
FIG. 11

INPUT DEVICE HAVING DOUBLE-LAYER ADHESIVE CONDUCTIVE CONNECTING PORTIONS

BACKGROUND OF THE INVENTION

This invention relates to an input device and, in particular, to an input device located on the surface of a display such as a liquid crystal display device (LCD), cathode ray terminal (CRT), and the like.

A typical input device is used to connect the display electrodes on the inner surface of the display substrates across a seal at the periphery of the display area of the display device to a drive circuit. A conventional input device 20 for a liquid crystal display device is shown in FIG. 1. Display device 20 includes an upper high-molecular weight resin film substrate 21 and an opposed lower glass substrate 22. Transparent electrodes 23 and 24, typically made of a film such as indium tin oxide (ITO), $SnO_2$, or other inorganic compounds, are disposed on resin film substrate 21 and glass substrate 22, respectively. Transparent electrodes 23 and 24 may be arranged as perpendicularly-oriented lines with respect to each other, or they may be formed in any other desired pattern. Substrates 21 and 22 are separated a predetermined distance from each other by spacers 25 and a seal member 26 about the periphery of the display area.

A flexible connecting member 27, which may be made of connecting wiring on a flexible printed circuit 31, connects an input power source to transparent electrode 23. In the most simple configuration (not shown), substrate 21 would extend beyond seal member 26 and electrode 23 would project beyond seal member 6 to contact flexible connecting member 27 to a conductive adhesive layer. Unfortunately, substrate 21 is made of an organic material, unlike glass substrate 22 and inorganic electrodes 23 and 24. Since the bonding of the inorganic electrode to the organic substrate is less secure than the bonding of two inorganic materials, it is more likely that an inorganic electrode will detach from organic resin film substrate 21 than from inorganic glass substrate 22. Accordingly, if flexible connecting member 27 was directly connected to electrode 23 with only a conductive adhesive layer between them, and flexible connecting member 27 was accidentally pulled, it is more likely that electrode 23 would disengage from substrate 21 than if flexible connecting member 27 was attached to an electrode connected to glass substrate 22.

In view of this, conventional input device 20, as shown in FIG. 1, is utilized to connect flexible connecting member 27 to electrode 23 indirectly, thereby reducing the chance that electrode 23 will detach from substrate 21. Instead of having electrode 23 extend beyond seal member 26, a relay electrode 28 is formed on glass substrate 22 which extends on substrate 22 from a position inside of seal member 26 to the outside. Relay electrode 28 is electrically connected to electrode 23 by a conductive adhesive layer 29, and to flexible connecting member 27 by a conductive adhesive layer 30. The advantage of input device 20 is that if flexible connecting member 27 is accidentally pulled, relay electrode 28 which is made of an inorganic material will more likely remain attached to inorganic glass substrate 22 than to organic substrate 21. In theory there is no force which would separate electrode 23 from substrate 21.

Conventional input device 20 is less than fully satisfactory in practice. This is due to the fact that film substrate 21 shrinks during production, because of the high production temperatures necessary in the heat pressing step, and later expands after cooling. Since electrode 23, conductive adhesive layer 30 and relay electrode 28 do not have the same shrinkage rate, undesirable stresses occur between relay electrode 28 and film substrate 21 which tend to cause cracks in electrode 23. This causes electrode 23 to peel from film substrate 21, or can cause conductive adhering layer 29 to peel from electrode 23.

Accordingly, the present inventors have improved the electrical connection of conductive adhesive agent 29 by including a conductive synthetic resin 40 disposed between electrode 34 on substrate 30 and conductive adhesive agent 29 as shown in FIG. 5. This improvement is the subject of the present invention, and is discussed in more detail below. To further eliminate peeling of electrode 23 from resin film substrate 21, the present inventors modified the traditional continuous seal 26 shown in FIG. 1 into forms for providing more support. In one attempt, seal 26 was modified into the continuous seal 126 shown in FIGS. 2 and 3 to include rectangular shape segment 127 which extends around and isolates conductive adhering layer 29 to support electrode 23 against film substrate 30. However, this configuration resulted in several disadvantages in that electrode 23 which passes through the inside circumference of continuous seal 26 is subject to strong bending stressed which can result in a crack 34. Formation of crack 34 raises the resistance of electrode 23 at the particular location and, as a result, decreases the strength of the signal which is input to the rest of electrodes 23. As will be discussed in further detail below, the inventors herein have resolved this cracking problem by making seal 127 discontinuous at the juncture between the electrode and substrate as shown in FIG. 16.

Efforts to eliminate cracking has included eliminating a portion of seal member 26 which runs across electrode 23 as shown in FIG. 4. However, in this case there is insufficient sealing material to seal substrates 21 and 23. Conductive adhesive agent 29 tends to peel from electrode 23 as substrate 21 is deformed during fabrication. This causes an inferior input to electrode 23.

In an input device wherein electrode 23 is formed only on substrate 21 directly and the display functions as an input device for digitizer-like use for line picture inputting on the input surface, the force of a pen or fingers at time of inputting is applied directly to the electrode. In this case electrode 21 on substrate 23 contacts electrode 24 on substrate 23 causing the display to degenerate.

Accordingly, it is desirable to provide a new input device having a conductive synthetic resin disposed between the electrode on the substrate and the conductive adhesive agent which eliminates the peeling of the electrode of the prior art. Additionally, it is desirable to provide a seal configuration to this new input device which will also help prevent electrode peeling but which will not cause bending stresses and cracks in the electrode.

SUMMARY OF THE INVENTION

Generally speaking, in accordance with the invention, an improved input device for a liquid crystal display device (LCD), cathode ray terminal (CRT), and the like having a first conductive member for electrically connecting an electrode on one substrate to the other substrate for connecting to drive circuitry, and a second conductive material softer than the first conductive member disposed between the first conductive member and the electrode on the first substrate is provided. The display device has two transparent substrates with a first transparent electrode disposed on the inner surface of the first transparent substrate of an organic material, and a second transparent electrode disposed on the inner surface of the second transparent substrate of an inorganic material. A seal member seals the facing surfaces of the opposed substrates.

Accordingly, it is an object of the invention to provide an improved input device.

It is another object of the invention to provide an input device which prevents cracking in the electrode of the display device.

It is a further object of the invention to provide an input device which prevents an inorganic electrode from peeling off an organic substrate.

Yet another object of the invention is to provide an input device which has improved adhesion between the conductive adhesive layer and the electrodes of the display device.

Still another object of the invention is to provide an input device in which the expansion and shrinkage of an organic film substrate which occur during thermal changes in production does not structurally damage the electrodes or conductive adhesive layer.

A further object of the invention is to provide an input device in which a the seal member does not cause cracking of the electrode.

An additional object of the invention is to provide an input device for a display which will be used to relay digital picture signals as input to an electronic device.

Still a further object of the invention is to provide an input device which provides a signal of excellent quality to the display device.

Yet another object of the invention is to provide an improved display device.

Still other objects and advantages of the invention will, in part, be obvious and will, in part, be apparent from the specification.

The invention accordingly comprises the several steps and the relation of one or more of such steps with respect to each of the others, and the article of manufacture possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 10 is a cross-sectional view of an input device in accordance with a further embodiment of the invention;

FIG. 11 is a plan view at line 11—11 of FIG. 10;

DESCRIPTION OF THE PREFERRED EMBODIMENT

To prevent peeling and cracking of an inorganic electrode on a transparent organic substrate, a second conductive synthetic resin thin film layer which is softer than the conductive adhesive layer for electrically connecting the electrode on one substrate to a relay electrode on the opposed substrate. The conductive synthetic resin thin film layer adsorbs the stress better than the conductive adhesive layer. Additionally, several variations utilizing this conductive synthetic resin thin film layer provide additional relief from the cracking and peeling of an inorganic electrode on an organic substrate.

Figure 5:
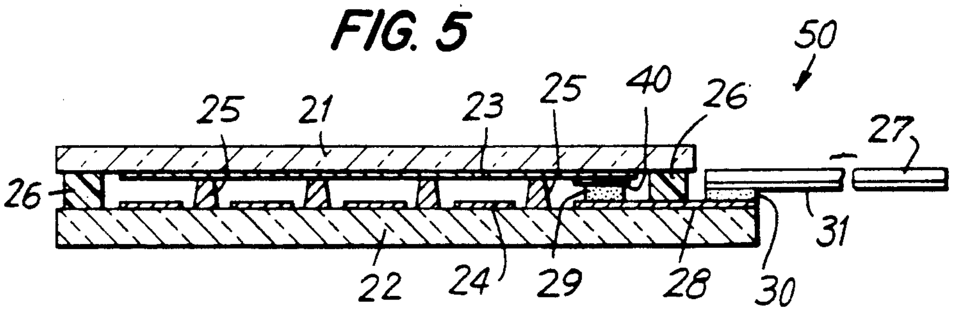
FIG. 5 is a cross-sectional view of a display device including an input device constructed and arranged in accordance with the invention.
Figure 6:
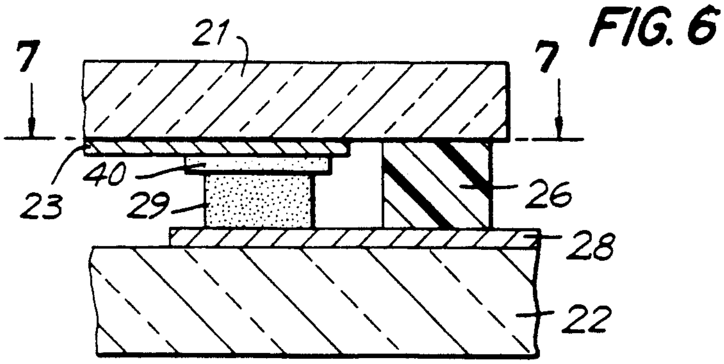
FIG. 6 is a cross-sectional view of the input device of FIG. 5.
Figure 7:
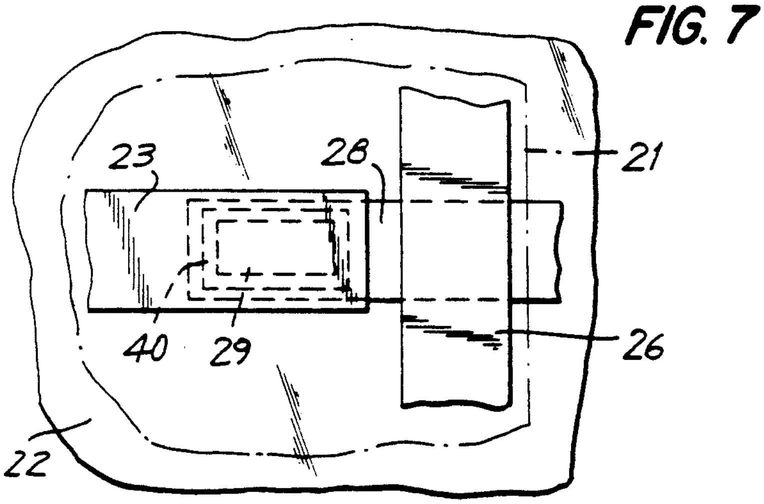
FIG. 7 is a plan view at line 7—7 of FIG. 6.

An input device 50 prepared in accordance with the invention is shown in FIG. 5, with the particularly significant portion shown in further detail in FIGS. 6 and 7. Input device 50 includes upper film substrate 21 with transparent electrode 23, opposed lower glass substrate 22 with transparent electrode 24, and relay electrode 28 for connecting upper electrode 23 to flexible connecting member 27. A seal 26 is disposed about the periphery of the display and conductive adhesive layer 29 couples relay electrode 28 to a conductive synthetic resin thin film layer 40 between electrode 23 and conductive adhesive layer 29. Conductive synthetic resin thin film layer 40 is disposed on substantially all surfaces between electrode 23 o film substrate 21 and conductive adhesive layer 29.

Conductive synthetic resin thin film layer 40 is made of a material which is softer than the material of conductive adhesive layer 29 and is conductive and elastic. The purpose of thin film layer 40 is to absorb stresses between substrates 21 and 22 and electrodes 23 and 28, and conductive adhesive layer 29, thereby preventing electrode 23 from cracking and peeling away from film substrate 21. A typical material used for conductive adhesive layer 29 is a silver filled epoxy adhesive agent which is mixed with a metallic material, such as copper powder or the like.

Thin film layer 40 may be a urethane adhesive agent containing a paste-like silver filler and may be painted on the surface of electrode 23 to a thickness of, for example, about 20–30 μm. After assembly there is an electrical connection between electrode 23 on film substrate 21 and relay electrode 28 on glass substrate 22 by conductive adhesive layer 29 and conductive synthetic resin thin film layer 40.

Figure 8:
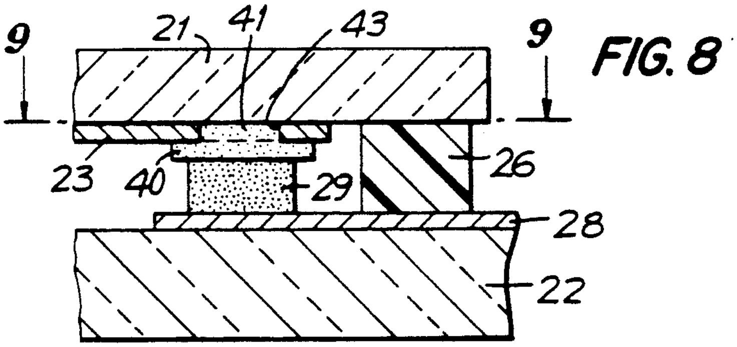
FIG. 8 is a cross-sectional view of an input device in accordance with another embodiment of the invention.
Figure 9:
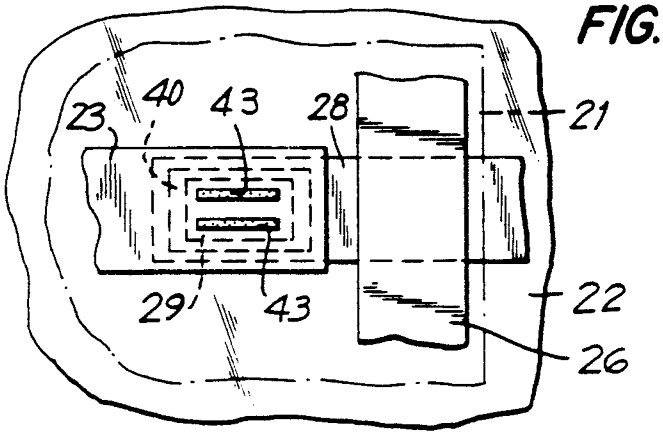
FIG. 9 is a plan view at line 9—9 of FIG. 8.

FIGS. 8 and 9 illustrate a variation of the type of input device in accordance with the invention as shown in FIGS. 6 and 7. An electrode opening 43 is formed in electrode 23 so that a thin film layer portion 41 of thin film layer 40 extends into electrode opening 43 and directly contacts film substrate 21. The particular electrode opening 43 depicted in FIG. 9 are two lengthwise slits, but it is anticipated that other shapes may be used.

The benefits of this variation is that portion 4 of thin film layer 40 which directly contacts film substrate 21 will generally adhere to film substrate 23 better than electrode 23 adheres to film substrate 21. This will prevent electrode 23 from peeling off from substrate 21 and will thereby improve the performance of the display device in which the input device is used.

Electrode opening 43 ma be formed by etching electrode 23 after it is formed on substrate 21 and before conductive synthetic resin thin film layer 40 is painted onto electrode 23. Additionally, the portion of substrate 21 which is exposed in electrode opening 43 may be treated before painting thin film layer 40 to strengthen the bond between substrate 21 and the portion 41 of thin film layer 40.

Alternatively, electrode 23 may be shortened and not overlap relay electrode 28 as shown in FIGS. 10 and 11. In this embodiment almost all of conductive synthetic resin film layer 40 is connected to film substrate 21, with only a portion 44 of film layer 40 connected to electrode 23. As in the previous embodiment, thin film layer 40 which directly contacts film substrate 21 will generally adhere better to substrate 23 than electrode 23 adheres to film substrate 21. This embodiment provides an additional advantage in that since electrode 23 and conductive adhesive layer 29 do not overlap in the vertical plane, the stress of thermal shrinkage which occurs during the manufacturing process is reduced which in turn minimizes cracks in and the peeling of electrode 23.

In a further modification of the first embodiment, electrode 28 may be similarly etched to form an opening so that a portion of conductive adhesive layer 29 directly adheres to glass substrate 22. This improves the adherence of electrode 28 on glass substrate 22. Likewise, a conductive synthetic resin film layer similar to the one described above may be positioned between electrode 28 and conductive adhesive layer 29 such that the resin film layer directly contacts glass substrate 22 through the openings in electrode 28. Although these additional embodiments are not always necessary since inorganic electrode 28 adheres better to inorganic glass substrate 22 than inorganic electrode 23 adheres to organic film substrate 21, the resulting display device will have improved performance.

Figure 12:
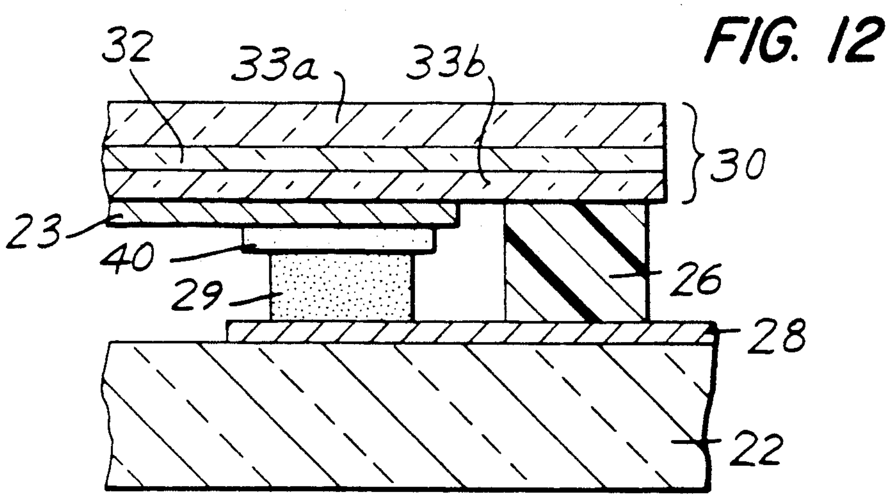
FIG. 12 is a cross-sectional view of an input device in a display with an elastic substrate in accordance with the invention.
Figure 13:
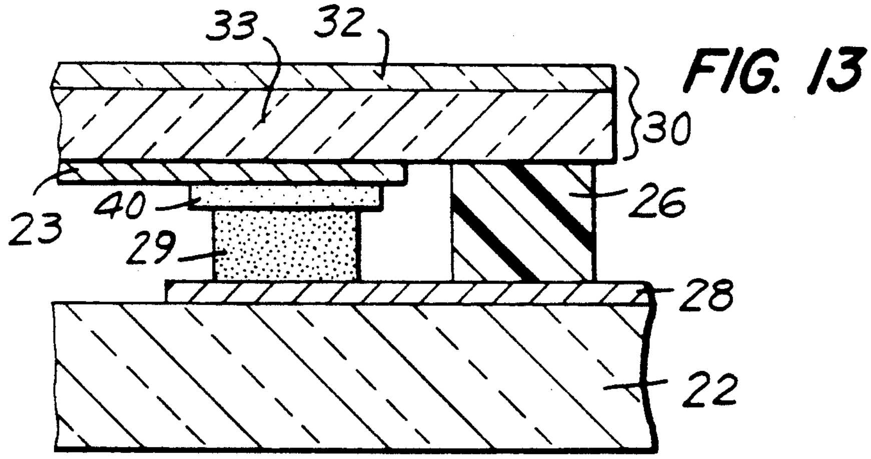
FIG. 13 is a cross-sectional view of a input device in the display of FIG. 12 with the elastic layer in a different position in accordance with the invention.
Figure 14:
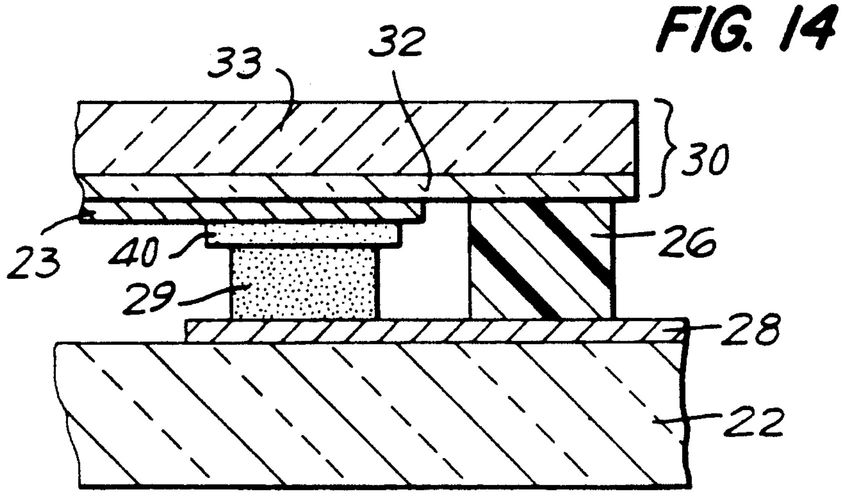
FIG. 14 is a cross-sectional view of an input device in the display of FIG. 12 with the elastic layer in another position in accordance with the invention.

FIGS. 12-14 illustrate other variations of the input device shown in FIG. 6. Substrate film 21 of FIG. 6 is replaced in FIG. 12 with a combined substrate 30 of an elastic layer 32 between a pair of supporting films **33*a* and 33*b*. In FIGS. 13 and 14, elastic layer 32 is positioned above and below a single supporting film 33**.

Ideally, elastic resin layer 32 is elastic and transparent, and is softer than the material used in supporting film 33. Examples of elastic resins which might be used include, but are not limited to, urethane resins, silicone resins, epoxy resins, and the like.

Combined substrates 30 in FIG. 12 may be produced by coating elastic layer 32 on supporting film **33*b* and then laminating supporting film 33*a* thereon. Another method is to make a film of elastic layer 32 and laminating supporting films 33 and 33*a* onto both sides of elastic layer 32**.

Tests comparing the input device of FIG. 6 to the input devices of FIGS. 12-14 show that the input devices have a starting resistance of 250 g load by the silicone rubber of 6 mmΦ. However, after the input operation had been carried out about one million times, cracks had appeared in the electrode 23 of the input device shown in FIG. 6 and had been transferred into glass substrate 22, and the resistance value increased. However, even after the input operation had been carried out over two million times, the resistance value remained the same in the input devices shown in FIG. 12-14.

Thus, the input devices prepared in accordance with these embodiments are particularly suited to display devices in which the input signal is a digital picture signal where electrode 23 is formed directly onto the film substrate because the stresses which occur during electrode formation are not directly applied to the electrode but are absorbed in the elastic resin layer 32. As a result, cracks on the electrode and corresponding damage to the opposing glass substrate is reduced, increasing the quality of the device.

Figure 1:
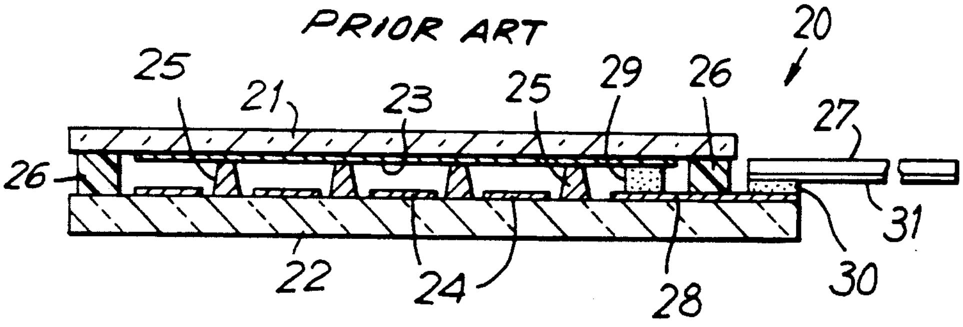
FIG. 1 PRIOR ART
FIG. 1 is a sectional view of a display device with a conventional input device.
Figure 2:
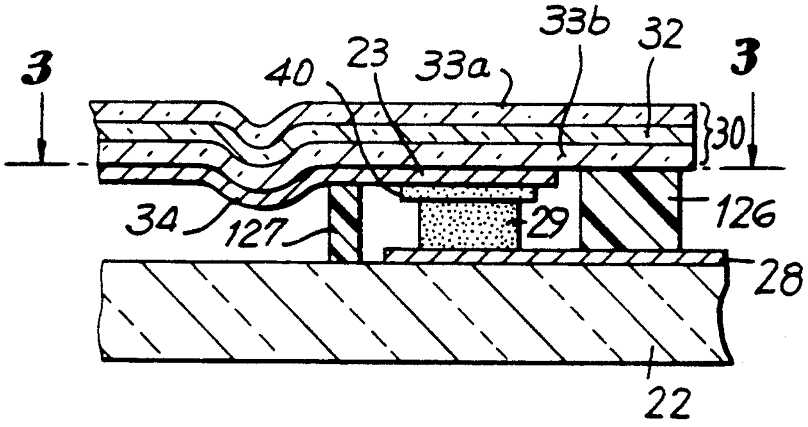
FIG. 2 is a sectional view of another input device which demonstrates a particular problem of electrode cracking.
Figure 3:
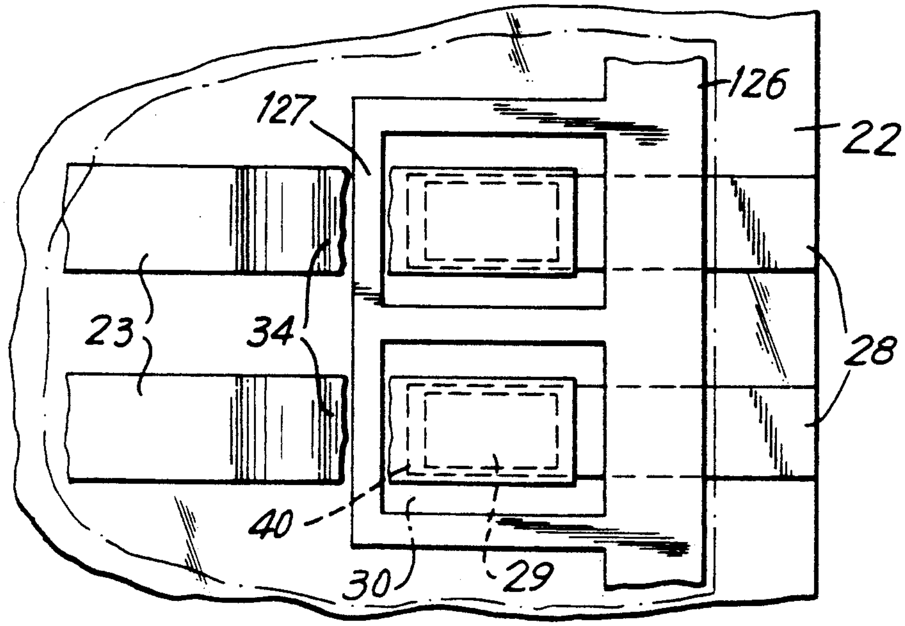
FIG. 3 is a cross-sectional view of the device of FIG. 2 taken along line 3—3.
Figure 4:
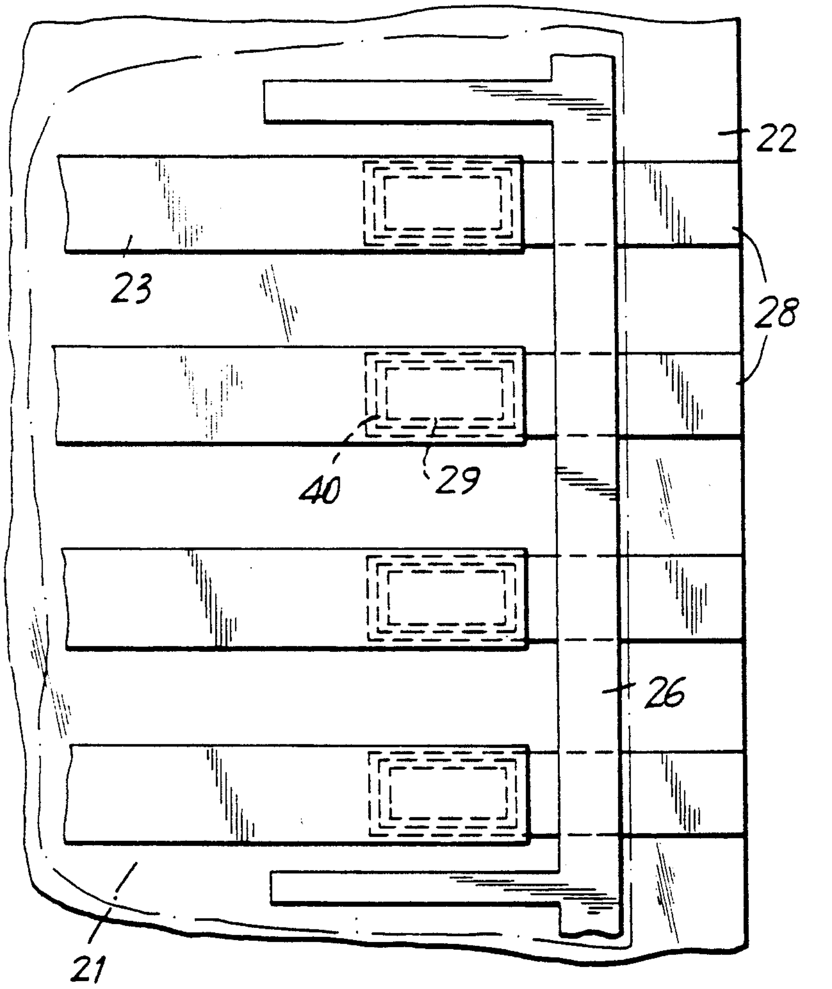
FIG. 4 is a plan view of a modified input device of the type illustrated in FIG. 1.

The display devices of FIGS. 2 and 3 include parallel electrodes 23, relay electrodes 28, conducting adhesive layers 29 and conductive synthetic resin thin film layers 40 between substrates 21 and 22. A seal 26 is disposed about the periphery of the display and perpendicularly crosses each relay electrode 28. In this embodiment a seal 126 includes a rectangular shape segment 127 which completely surrounds each conductive adhesive layer 29. While this configuration prevents electrode 23 from peeling off of film substrate 30, it also often results in a crack 34 forming in electrode 23.

Figure 15:
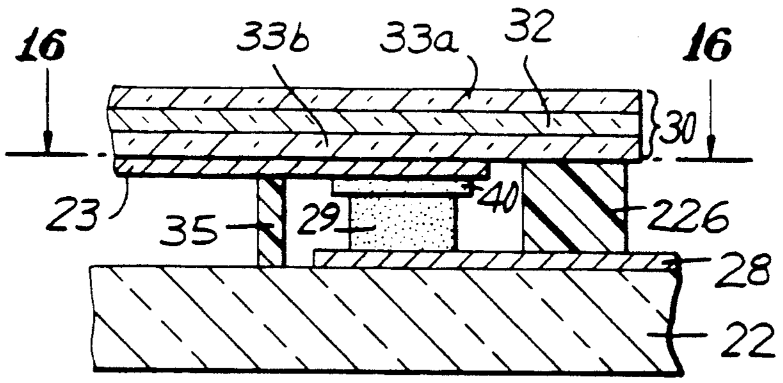
FIG. 15 is a cross-sectional view of an input device in a display device with a different seal in accordance with another embodiment of the invention.
Figure 16:
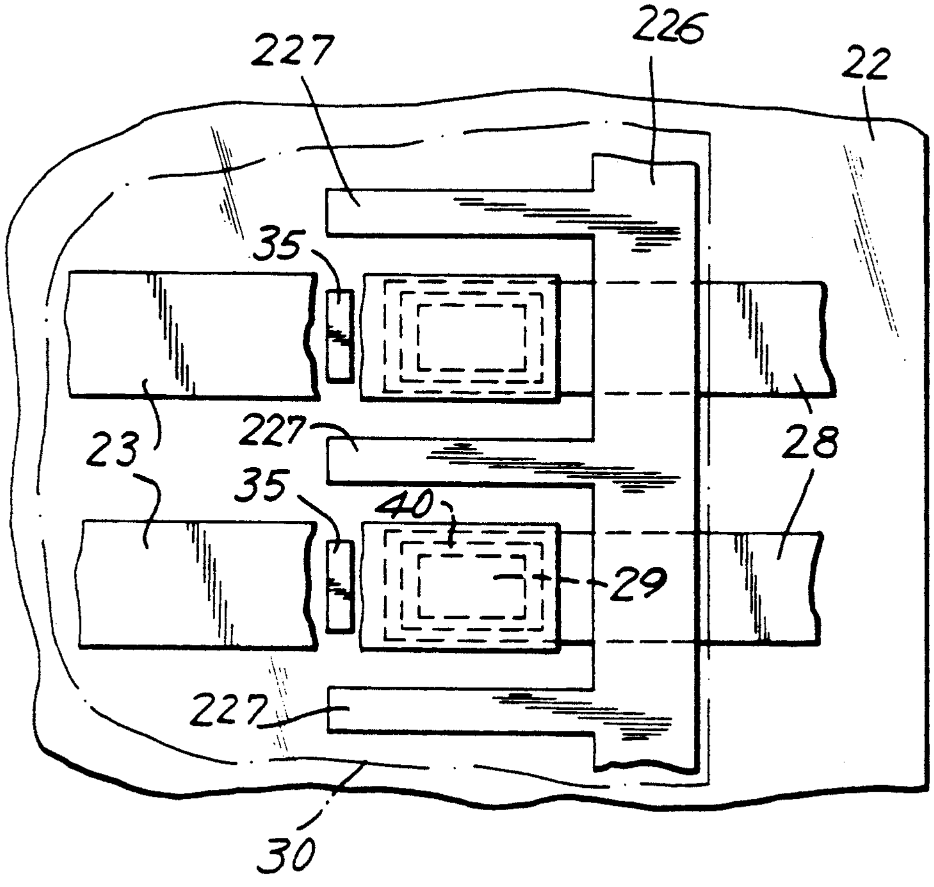
FIG. 16 is a cross-sectional view of the device of FIG. 15 taken along line 16—16.

In order to prevent cracking, FIGS. 15 and 16 illustrate a seal 226 which reduces the cracking while still preventing the peeling of electrode 23 from substrate 30. Seal 226 is a continuous, rectangular shape where it crosses relay electrodes 28 and includes parallel legs 227 which extend parallel to electrodes 23 and 28 a distance past conductive adhesive layer 29. A discontinuous seal segment 35 is placed across each corresponding electrode 23. The length of each discontinuous seal segment 35 is about two-thirds the width of corresponding electrode 23. In this embodiment, seal 226 and segment 35 are made of a silicone adhesive agent, but other adhesive agents can be used.

The resulting input device shown in FIGS. 15 and 16 had no cracks in or peeling of electrodes 23. The reliability of the display device incorporating the input device was greatly improved.

Specific advantages of the input devices of this invention as hereinabove described include a significant reduction of electrode cracking and peeling. Thus, the reliability of the input devices is maintained and the input resistance does not increase. Display devices utilizing the input devices of the invention will therefore have improved reliability and display quality.

It will thus be seen that the objects set forth above, among those made apparent from the preceding description, are efficiently attained, and certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understand that the following claims are intended to cover all of the generic and specific features of the invention herein described and all statements of the scope of the invention which, as a matter of language, might be said to fall therebetween.

What is claimed is:

1. An input structure of a display device, comprising:
opposed first and second transparent substrates with transparent electrodes disposed on the inner surfaces thereof;
a seal about the periphery of the transparent substrates for sealing the substrates together and defining a display region on the interior of the seal;
a relay electrode disposed on the second transparent substrate crossing from the interior of the seal to the exterior thereof;
a conductive adhesive layer and a conductive resin film layer disposed thereon for electrically coupling the electrode on the first substrate to the relay electrode on the second substrate for electrically connecting the electrode on the first substrate to the exterior of the seal; and
the conductive resin film layer made of a conductive material that is softer than the conductive adhesive layer for absorbing shock to prevent separation of the transparent electrode from the first substrate.

2. The input structure of claim 1, wherein the first substrate is formed of a synthetic resin material and the second substrate is formed of an inorganic material.

3. The input structure of claim 2, wherein the electrodes are formed of inorganic material.

4. The input structure of claim 1, wherein a portion of one of the transparent electrodes in the region contacted by the conductive resin film layer has been removed so that the conductive resin film is adhered directly to the corresponding substrate.

5. The input structure of claim 2, wherein a portion of the relay electrode on the inorganic substrate in the region contacted by the conductive adhesive layer is removed so that a portion of the conductive adhesive layer is directly adhered to the inorganic substrate.

6. The input structure of claim 1, wherein the conductive resin film layer is a silver filled urethane adhesive.

7. The input structure of claim 6, wherein the conductive adhesive layer is a silver filled epoxy adhesive including electrically conductive material.

8. The input structure of claim 1, wherein the transparent electrode on the first substrate does not overlap the conductive adhesive layer in plan view so that the conductive resin film layer directly contacts the first substrate and the conductive adhesive layer, the transparent electrode on the first substrate contacting a portion of the conductive resin film layer for electrically connecting the transparent electrode to the relay electrode.

9. The input structure of claim 1, including a plurality of substantially parallel transparent electrodes on the first substrate and a plurality of corresponding relay electrodes disposed on the second substrate, a plurality of conductive adhesive layers and conductive resin film layers for electrically connecting the electrodes on the first substrate to the corresponding relay electrodes and the seal including projecting segments extending perpendicular therefrom, the seal on the periphery extending perpendicularly therefrom between the parallel electrodes on the first substrate, the projections extending beyond the conductive adhesive layers and a discontinuous seal segment disposed between at least one of the transparent electrodes on the first substrate and an opposed portion of the second substrate.

10. The input structure of claim 9, wherein a discontinuous portion of the discontinuous segment seal extends about two thirds the width of the transparent electrodes on the first substrate.

11. The input structure of claim 1, wherein the first substrate is a multi-layer structure including at least one elastic layer.

12. The input structure of claim 11, wherein the elastic layer is disposed between two synthetic resin layers.

13. The input structure of claim 11, wherein the first substrate includes a synthetic resin layer and an elastic layer on the exterior thereof.

14. The input structure of claim 11, wherein the first substrate includes a synthetic resin layer and an elastic layer disposed on the interior thereof so that the transparent electrodes are disposed on the elastic layer.

15. The input structure of claim 1, wherein the conductive resin film layer is between about 20 to 30 μm thick.

16. A liquid crystal display device, comprising a first transparent synthetic resin substrate having a, plurality of substantially parallel transparent electrodes thereon an opposed second transparent inorganic substrate having a plurality of corresponding transparent relay electrodes disposed on the second substrate, a plurality of conductive adhesive layers having conductive resin film layers disposed thereon for electrically coupling the electrodes on the first substrate to the corresponding relay electrodes, and a seal disposed about the periphery of the transparent substrates for defining an interior display region and for receipt of a liquid crystal material, the seal including projecting segments extending perpendicularly therefrom between the parallel electrodes on the first substrate, the projections extending beyond the conductive adhesive electrodes and a discontinuous seal segment disposed between at least one of the transparent electrodes on the first substrate and on opposed portion of the second substrate, the relay electrodes extending from the interior of the display to the exterior for electrically connecting the electrodes on the first substrate to driving circuitry, the conductive adhesive layers and conductive resin film layers to form an electrical connection between the electrodes on the first substrate and the relay electrodes, the conductive resin film layers formed of a conductive material which is softer than the conductive material of the conductive adhesive layers for absorbing shock to prevent separation of the transparent electrodes from the first substrate.

17. The liquid crystal display device of claim 16, wherein a portion of one of the transparent electrodes contacted by the conductive resin film has been removed so that the conductive resin film is adhered directly to the corresponding substrate.

18. The liquid crystal display device of claim 16, wherein a portion of each relay electrode on the organic substrate is removed so that a portion of the conductive adhesive layer is directly adhered to the organic substrate.

19. The liquid crystal display device of claim 16, wherein the electrodes disposed on the first substrate are substantially parallel electrode stripes and the electrodes on the second substrate are substantially parallel electrode stripes and substantially perpendicular to the electrodes on the first substrate with the substrates maintained apart by a plurality of spacers dispersed throughout the display.

20. An input structure of a display device, comprising:

opposed first and second transparent substrates and a seal about the periphery of the transparent substrates for sealing the substrates together and defining a display region on the interior of the seal;

a plurality of substantially parallel transparent electrodes disposed on the first substrate and a plurality of corresponding relay electrodes disposed on the second substrate, the relay electrodes crossing from the interior of the seal to the exterior thereof;

a plurality of conductive adhesive layers and conductive resin film layers on the adhesive layers for electrically coupling the transparent electrodes on the first substrate to the corresponding relay electrodes on the second substrate, within the interior of the seal, for electrically connecting the electrodes on the first substrate to the exterior of the seal;

the conductive resin film layers made of a conductive material softer than the conductive adhesive layers; and the seal including projecting segments extending perpendicularly therefrom between the parallel electrodes on the first substrate, the projections extending beyond the conductive adhesive layers and a discontinuous seal segment disposed between at least one of the transparent electrodes on the first substrate and an opposing portion of the second substrate.

* * * * *